US 6,813,604 B1

(12) United States Patent
Shih et al.

(10) Patent No.: US 6,813,604 B1
(45) Date of Patent: Nov. 2, 2004

(54) METHODS AND APPARATUS FOR SPEAKER SPECIFIC DURATIONAL ADAPTATION

(75) Inventors: Chi-Lin Shih, Berkeley Heights, NJ (US); Jan Pieter Hendrik van Santen, Lake Oswego, OR (US)

(73) Assignee: Lucent Technologies Inc., Murray Hill, NJ (US)

( * ) Notice: Subject to any disclaimer, the term of this patent is extended or adjusted under 35 U.S.C. 154(b) by 410 days.

(21) Appl. No.: 09/711,563

(22) Filed: Nov. 13, 2000

Related U.S. Application Data

(60) Provisional application No. 60/166,142, filed on Nov. 18, 1999.

(51) Int. Cl.[7] .................. G10L 13/08; G10L 13/06; G10L 21/00
(52) U.S. Cl. ................ 704/260; 704/267; 704/258; 704/264
(58) Field of Search .................. 705/37, 14, 1; 704/227, 275, 268, 267, 260, 258; 358/1, 15

(56) References Cited

PUBLICATIONS

Valbert et al. "Voice Transformation Using PSOLA Technique," 1992, IEEE ICASSP–92, vol. 1, pp. 145–148.*

* cited by examiner

*Primary Examiner*—Richemond Dorvil
*Assistant Examiner*—V. Paul Harper

(57) ABSTRACT

A text to speech system modeling durational characteristics of a target speaker is addressed herein. A body of target speaker training text is selected having maximum possible information about speaker specific characteristics. The body of target speaker training text is read by a target speaker to produce a target speaker training corpus. A previously generated source model reflecting characteristics of a source model is retrieved and the target speaker training corpus is processed to produce modification parameters reflecting differences between durational characteristics of the target speaker and those predicted by the source model. The modification parameters are applied to the source model to produce a target model. Text inputs are processed using the target model to produce speech outputs reflecting durational characteristics of the target speaker.

23 Claims, 14 Drawing Sheets

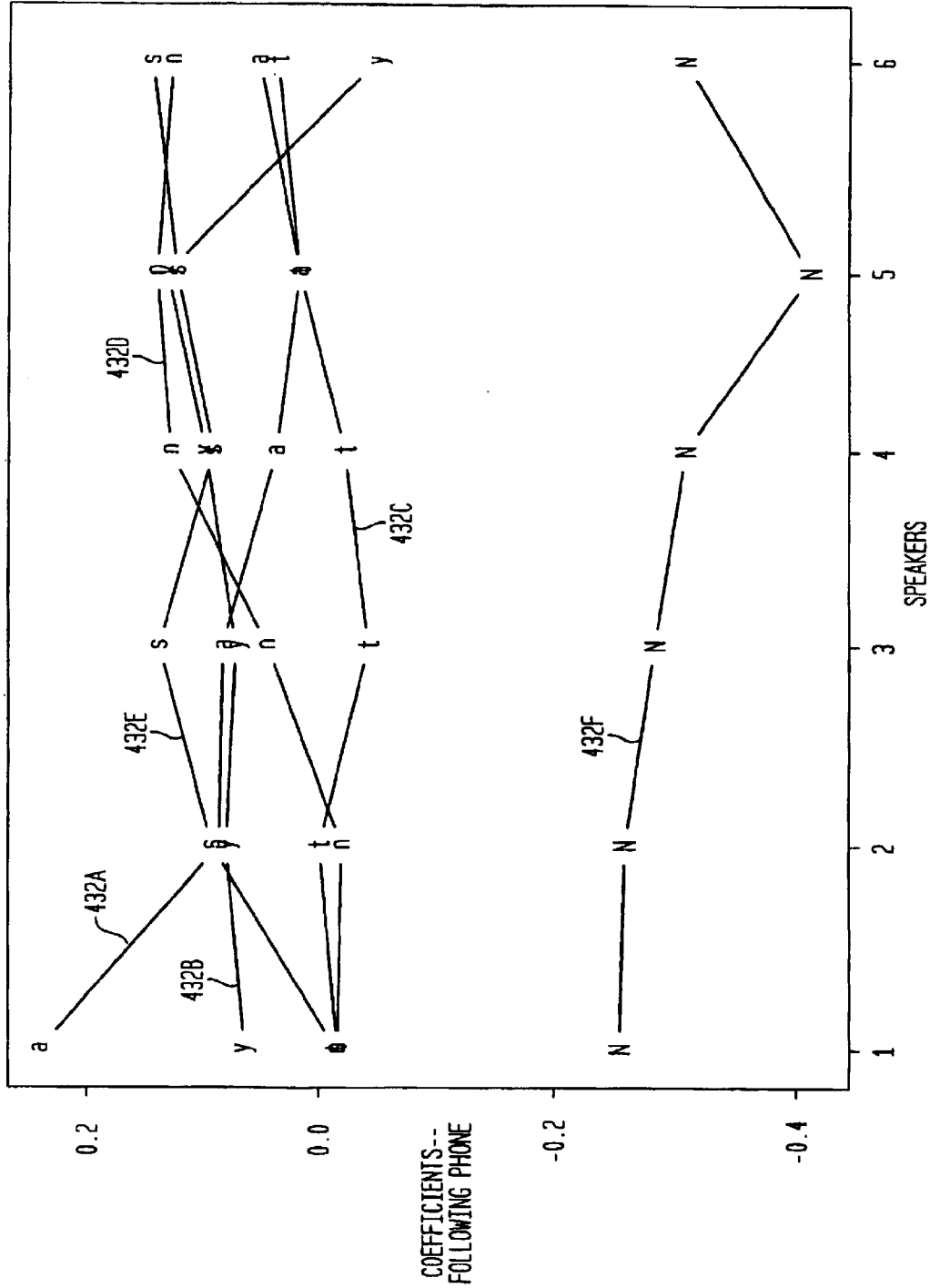

FIG. 4F

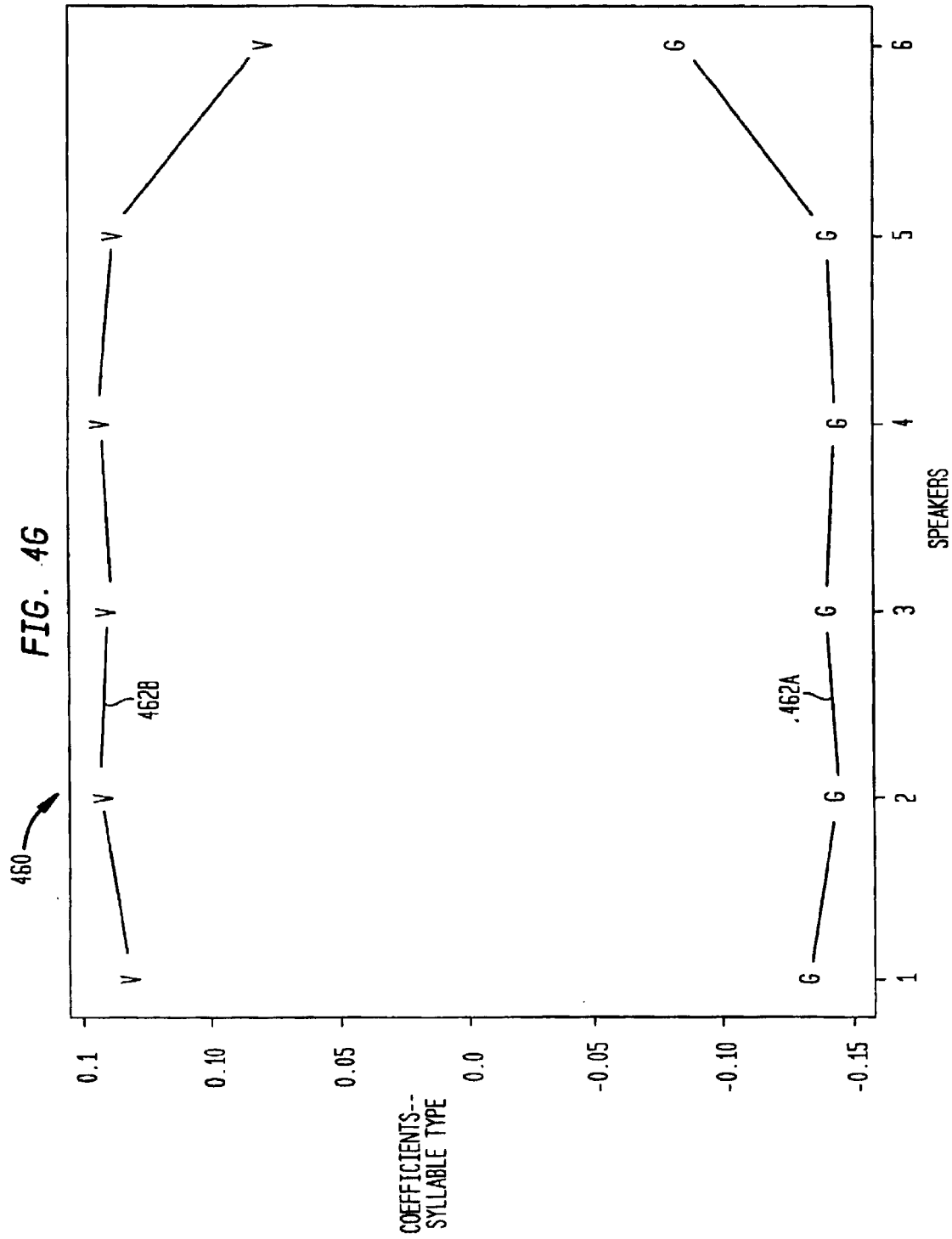

METHODS AND APPARATUS FOR SPEAKER SPECIFIC DURATIONAL ADAPTATION

This application claims the benefit of U.S. Provisional Application Ser. No. 60/166,142, filed Nov. 18, 1999.

FIELD OF THE INVENTION

The present invention relates generally to improvements in text to speech systems. More particularly, the invention relates to the use of speaker specific characteristics in developing durational models for text to speech systems.

BACKGROUND OF THE INVENTION

A text to speech system receives text inputs, typically words and sentences, and converts these inputs into spoken words and sentences. A typical text to speech system performs text analysis to predict phone sequences, duration modeling to predict the length of each phone, intonation modeling to predict pitch contours and synthesis to combine the results of the different analyses and modules in order to create speech sounds. A significant element in any text to speech system, and the element which is addressed by the present invention, is duration modeling.

In order to construct a duration model, the system typically processes a body of training data, established by having a target speaker read a body of selected material to the system. The text to speech system analyzes the body of material in order to construct the model of the speaking style of the target speaker. By reading a substantial body of text, properly selected to include instances of each phone in all contexts in which it occurs, the target speaker is able to expose the system to a comprehensive example of his or her speaking style, so that the system can develop a model which accurately reflects the numerous different parameters which make up the speaker's speaking style.

When a source speaker reads the training corpus to a text to speech system, the system is trained to learn simultaneously the characteristics of the language and the speaker's individual speech characteristics. With prior art systems, no distinction is made between the language specific component and the speaker specific component. Therefore, training the system to learn a new speaker's characteristics requires that the system repeat the entire training process for every new speaker. The training process is not shortened or simplified by the information previously provided by training the system to a prior speaker. The system must be trained anew, using a large training corpus, in order to enable the system to mimic that speaker. Proper training of a system may involve reading several hours of text to the system. The speech resulting from reading the text must be processed in order to train the system.

The need to fully train a system for each speaker represents a significant obstacle to more widespread use of prior art systems. One use for a text to speech system which could mimic the user's own voice might include a voice email system which transmitted text and voice characteristics. The text could be converted to speech mimicking the sender's voice at the receiving station. Transmitting text together with voice characteristics would consume considerably less bandwidth than transmitting a recording of the sender's voice. Moreover, transmitting text together with voice characteristics would always make a sender's voice available for sending, even in cases in which was impossible or inconvenient to make a true recording of the sender's voice. Another application might involve wireless telephony. A near end telephone could convert speech to text and transmit this text, together with the speaker's voice characteristics, to the far end. At the far end, the text and voice characteristics could be reconstructed to mimic the speaker's voice. Using such a system would save considerable bandwidth and would allow transmissions which sounded like the voices of the speakers. However, the need for prior art systems to be trained for each speaker presents a significant obstacle to such uses of speaker specific systems. The typical user does not wish to spend hours reading training sentences.

In order to reduce the need to develop a new model for each new target speaker, some prior art systems have simply measured the speaking rate of the target speaker and changed the speaking rate of the source model to conform to the speaking rate of the target speaker. This process has not yielded an accurate model of the target speaker because changing the speaking rate shortens or lengthens all sound classes equally. Different speakers who share the same speaking rate typically do not have the same duration for all sound classes. Moreover, differences in the speaking rates of different speakers do not typically consist of changes reflected uniformly among all sound classes between one speaker and another. To take a simplified example, a first speaker may have a comparatively longer duration for fricatives compared to other sound classes than does a second speaker. Changing the speaking rate of the first speaker by shortening the duration of all sound classes will not replicate the speaking style of the second speaker, because fricatives will remain comparatively long compared to other sound classes under the uniform shortening process resulting from changing the speaking rate.

There exists, therefore, a need for a text to speech system which can be trained to create a duration model mimicking the speaking style of a target speaker based on differences between the target speaker and a source speaker, and which employs a relatively small training corpus to identify the differences between the target speaker and the source speaker.

SUMMARY OF THE INVENTION

In one aspect, a process of target speaker training according to the present invention advantageously comprises developing a source model using a large body of training data in order to develop a source model reflecting language specific characteristics as well as speaker specific characteristics for a source speaker. In order to develop a target model for a specific target speaker, a smaller body of training data is selected to yield information about the speaker specific characteristics of the target speaker. The body of training data is used to develop a training corpus which is then processed to produce modification parameters identifying differences between the durational characteristics of the target speaker and those of the source speaker. The modification parameters are then applied to the source model to produce a target model.

A more complete understanding of the present invention, as well as further features and advantages of the invention, will be apparent from the following Detailed Description and the accompanying drawings.

BRIEF DESCRIPTION OF THE DRAWINGS

FIGS. 4A–4G are graphs illustrating cross-speaker effects of factors influencing durational characteristics;

DETAILED DESCRIPTION

Figure 1:
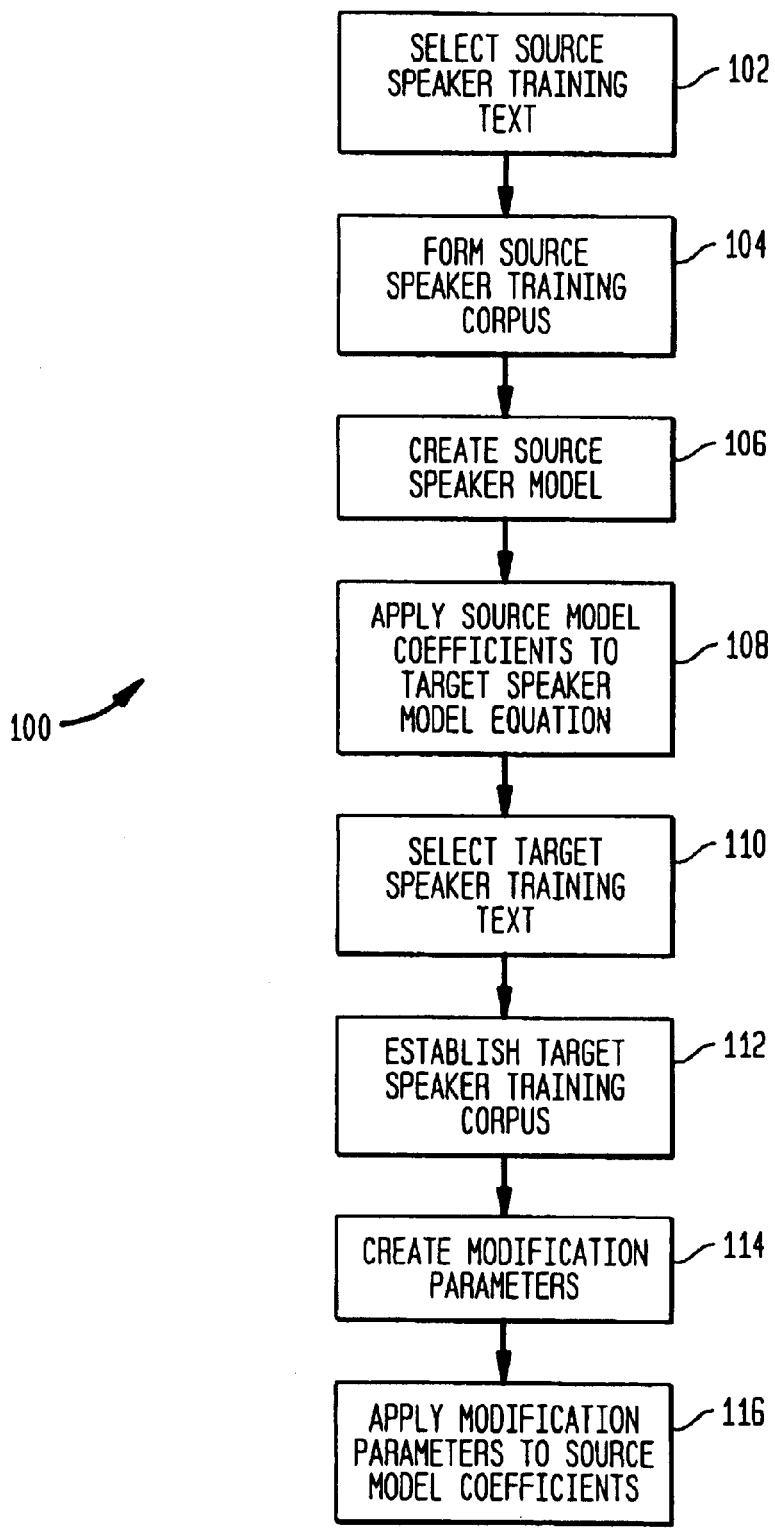
FIG. 1 illustrates a method of text to speech training according to the present invention.

FIG. 1 illustrates a method 100 of text to speech training according to the present invention. At step 102, a body of source speaker training text is selected. At step 104, the body of text is read by a selected human speaker, or source speaker, to form a source speaker training corpus. At step 106, the source speaker training corpus is analyzed to form a source speaker durational model, or source model, reflecting the durational characteristics of the speaking style of the source speaker. The source model is used to produce speech output mimicking the source speaker's style in response to text inputs. The source model is also used as a base model which may be modified based on data from a target speaker, different from the source speaker, to create a target model. The target model, when created, is used to produce speech output mimicking the target speaker's style.

At step 108, coefficients taken from the source model are applied to a target speaker model equation in order to provide data for development of a target speaker model. The target speaker model is chosen to predict durational characteristics of a target speaker, and is preferably derived from application of modification parameters to the source model. The modification parameters predict differences in durational characteristics between the predictions of the source model and the characteristics of the target speaker. At step 110, a body of target speaker training text is selected. The training text is selected using a greedy selection algorithm and is chosen to maximize the information which the text provides about speaker specific characteristics. At step 112, a target speaker reads the target speaker training text to establish a target speaker training corpus. At step 114, the target speaker training corpus is analyzed to create the modification parameters, which define the differences between durational characteristics of the target speaker and those of the source speaker. At step 116, the modification parameters are applied to the source model coefficients which have previously been applied to the target speaker model equation, in order to create the target model.

Figure 2:
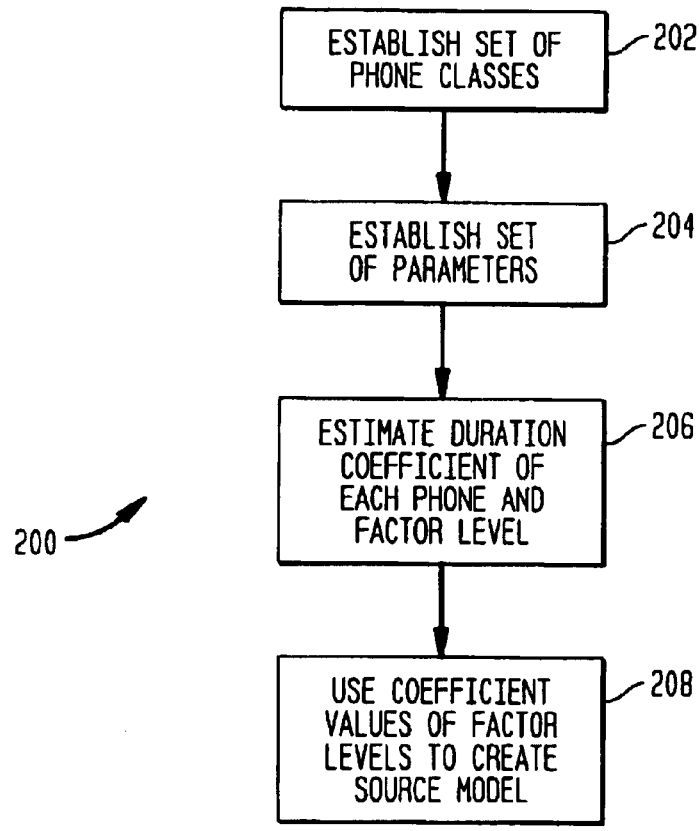
FIG. 2 illustrates a process of source speaker training according to the present invention.

FIG. 2 illustrates a process 200 of source speaker training corpus analysis and source model creation 200 according to the present invention. The process 200 may preferably be employed as step 106 of the process 100 of FIG. 1. At step 202, a set of phone classes is established. The phone classes are established based on known characteristics of the language, confirmed by the analysis of the source speaker training corpus. Phones in the same class respond homogeneously to the influence of other factors. At step 204, a set of parameters is established, comprising a set of factors, each factor taking on one of several possible levels. The classification of factor levels is advantageously performed by iterative data analysis searching for groupings with homogeneous effects on phone duration. Each phone level and factor level is a parameter to be fitted with the model.

At step 206, the source corpus is analyzed to estimate the duration coefficient of each phone and factor level. At step 210, the coefficient values of the parameters are used to create the source model.

An exemplary source model which may be generated by the process 200 of FIG. 2 is a Mandarin duration model. Mandarin includes six major sound classes, and the exemplary model includes six multiplicative models corresponding to the six major sound classes. The sound classes include the following:

1. Vowel (V): 15 vowels, including 4 diphthongs.
2. Fricative (F): 5 fricatives f, s, x (palatal), S (retroflex) and h.
3. Stop and affricate closure (C): 6 stops and 6 affricates.
4. Stop and affricate burst and aspiration (B): 6 stops and 6 affricates.
5. Nasal coda consonant (N): 2 nasal codas. 1 relatively rare retroflex coda is also included.
6. Sonorant consonant (S): 8 sonorant consonants/voiced consonants, including 2 nasals, 3 on-glides, the lateral sound 1, and 2 voiced fricatives.

Fourteen factors are considered in producing the exemplary source model. The level of each factor, that is, the effect of the factor on the duration of a phone affected by the factor, can be represented numerically. The factors are as follows:

1. Phone identity.
2. Tone. Mandarin has 4 lexical tones, one sandhi tone and a neutral tone which is similar to an unstressed syllable. The tone levels may be combined differently in each terminal category.
3. Preceding phone, grouped by phone classes. There are 47 levels originally, representing 47 possible preceding phones. They are combined into smaller number of homogeneous classes for modeling purposes in order to reduce the number of parameters that need to be estimated. The levels may be combined differently in each sound category. This factor has a strong effect in the vowel category, indicating that the vowel duration is affected by the sound class of the preceding phone. This factor has a much weaker effect in the initial consonant categories.
4. Preceding tone. This factor primarily distinguishes whether the preceding tone is a full tone or a neutral tone.
5. Following phone. Grouped by phone classes. The division is different in each category. For example, vowel height distinction has an effect in the fricative category but not in the nasal coda category.
6. Following tone.
7. Prominence.
8. Position of the syllable in the word with respect to distance to the word-initial position. Levels are typically chosen to indicate whether the syllable is first, second or other.
9. Position of the syllable in the word with respect to distance to the word-final position. Levels are typically chosen to indicate whether the syllable is last, penultimate or other.
10. Position of the syllable in the phrase (initial).
11. Position of the syllable in the phrase (final).
12. Position of the syllable in the utterance (initial).
13. Position of the syllable in the utterance (final).
14. Syllable structure.

Most factors have a number of possible levels, such that the total number of parameters created by the various factor/level combinations is more than 200. The source model is given by determining the values of the parameters $D_{mean}(p)$ and $Di(fi)$, i=1, . . . ,n and using these values in the following equation:

$$Dur(p) = D_{mean}(p) * D1(f1) * \ldots * Dn(fn), \quad (1)$$

where Dur(p) is the predicted duration of the phone p, $D_{mean}(p)$ is the coefficient of the corrected mean duration of the phone p and Di(fi), i=1, . . . ,n, is the parameter whose value reflects the contribution of the factor i when it has level fi. During the training phase, dur(p) is fitted to actual speech data to obtain the values of the coefficients. Analysis of the source corpus provides information which makes it possible to solve equation (1) for the values of Di(fi), i=1, . . . n, which is possible because the value $D_{mean}(p)$ is known for each phone and the training corpus includes the values of Dur(p) for each phone as affected by each factor.

Mandarin is used here as an example, but all other spoken languages have different phone classes with various levels affecting durational characteristics of each phone class, and can be analyzed and modeled in a similar way.

The source model is created by substituting the values of Di(fi), i=1, . . . ,n into equation (1), thus giving the influence of the various factors and levels on each phone.

Figure 3:
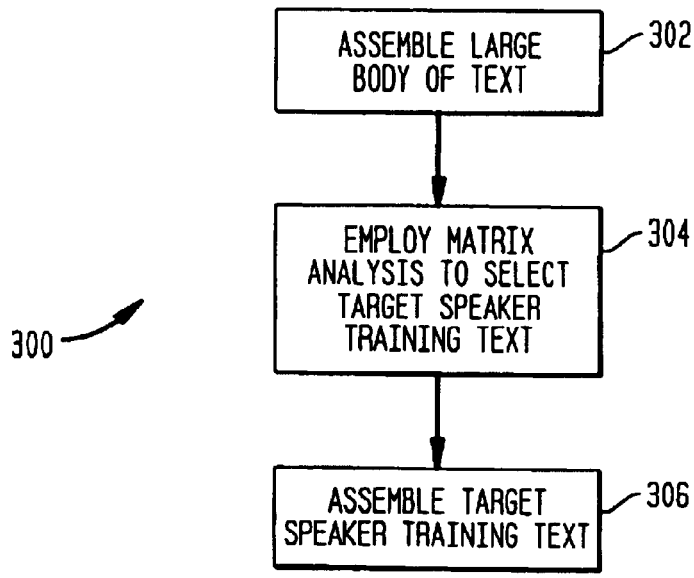
FIG. 3 illustrates a process of target speaker training text selection according to the present invention.

FIG. 3 illustrates a process of target speaker model text selection 300 according to the present invention. The process 300 is preferably employed to implement the step 108 of the process 100 of FIG. 1.

At step 302, a large body of text is assembled from which the target speaker training text is to be drawn. The large body of text is chosen to include all parameters to be reflected in the model. At step 304, analysis is performed on the large body of text in order to identify a minimal subset of the large body of text which will provide sufficient information for estimation of parameters to be used in the target speaker model equation retrieved at step 107 of FIG. 1. An equation preferably employed in connection with the teachings of the present invention is given by the following equation:

$$Dur(p)_s = D_{mean}(p)^k * D1(f1)^{k1} * \ldots * D1(f1)^{kn}, \quad (2)$$

wherein the values of $D_{mean}(p)$ and D1(f1), . . . ,D1(f1) are taken from the values generated by training the source model of equation (1) and wherein value of k is the modification parameter of the phones, and k1, . . . ,kn are modification parameters of the factors. Together they define differences between the values predicted by the source model and the characteristics of the target speaker. Determining the values of $D_{mean}(p)$, D1(f1), . . . ,D1(f1) and k, k1, . . . ,kn and using these values in equation (2) provides the target speaker model, which is used to generate the values of $Dur(p)_s$, the duration pattern of speaker S. Analysis of the large body of text is preferably performed according to the techniques described in Buchsbaum U.S. Pat. No. 6,038,533, assigned to the assignee of the present invention and incorporated herein by reference in its entirety, and comprises the mapping of sets of feature vectors corresponding to phonetic segments in each sentence of the underlying large body of text into design matrices corresponding to each sentence in the large body of text which are related to the parameter space of the model rather than the feature space of the large body of text.

The large body of text is operated on to produce sets of feature vectors corresponding to each sentence in the large body of text. Those sets of feature vectors are then mapped into a plurality of incidence matrices which are in turn converted to design matrices based on the duration model given by equation (2). A greedy algorithm for finding the matroid cover for this plurality of design matrices and incorporating modified Gram-Schmidt orthonormalization procedure is applied to find an optimum full-rank matrix comprising a small set of sentences containing enough data to estimate the parameters of the model. Details of the greedy algorithm are disclosed in more detail in the Buchsbaum patent cited above, but the algorithm takes the following principles into account. Matrix analysis is performed by taking the following principles into account. A feature vector f(x)=(f1, f2, . . . , fn) corresponding to a given phone segment x can be uniquely represented as a compound row vector r(f), in which each sub-vector $r_k(f)$ encodes the level on the corresponding factor. One way to do this is to have the vector component corresponding to the level in the factor set equal to 1 and the remaining components equal to 0. Usually, the last level is represented as a vector of −1. Then r(f) is defined as $(r_1(f), \ldots r_K(f),1)$, where the last 1 corresponds to the constant term in the model, and K denotes the total number of terms in the Analysis-of-Variance model. The design matrix for a corpus C is a vertical stack of matrices X(s), where s ranges over C. Let D(C) be the corresponding vector of observed duration and P be the column vector of parameters. In that case, D(C)=X(C)·P. P is estimable if and only if the matrix X(C) is of full rank. Optimization therefore consists of finding a minimal subset of C, C', such that X(C') is also of full rank.

It will be recognized that Buchsbaum discloses a preferred method for selecting target speaker training text, but alternative methods may be employed, provided that they select text which can be employed to identify differences between predicted durational characteristics of a source speaker and durational characteristics as reflected in the speech of a target speaker.

At step 306, the selected text is assembled to form the target speaker training text.

Once the target speaker training text has been selected, it can be processed to produce modification parameters reflecting differences between durational characteristics of a target speaker and characteristics predicted by the source model. Producing the modification parameters is made easier by the fact that the effects of the levels of a particular factor on the duration of a phone affected by the factor are in scale across speakers. This makes it possible to use the same modification factor for all levels of a factor, because the modification factor affects each level of the factor in the same way.

For example, suppose that speaker 1 is the source speaker and the factor f2 causes the coefficient D2 to be 100% of the $D_{mean}(p)$ if the factor f2 has level 1 and 110% of $D_{mean}(p)$ if the factor f2 has level 2. If the factor f2 for speaker 2 has an effect of 110% of that of speaker 1, this change is the same through all levels of the factor. That is, for speaker 2 the factor f2 causes the coefficient D2 to be 110% of $D_{mean}(p)$ if the factor f2 has level 1, and the factor f2 causes the coefficient D2 to be 121% of the mean duration if the factor f2 has level 2. That is, the factor f2 at level 2 causes the value of the coefficient D2 for speaker 2 to be 110% of the value of the coefficient D2 for speaker 1 in the presence of factor f2 at level 2. Since the presence of the factor f2 at level 2 for speaker 1 causes the value of D2 to be 110% of the mean duration, the value of D2 for speaker 2 is 110% of 110%, or 121%. Therefore, in order to change from the speaker represented by equation (1) above, the factors f1 . . . fn need only be modified by a single modification parameter for each factor. It is not necessary to determine a modification parameter for each possible level of a factor.

FIGS. 4A–4G present data demonstrating scaling of factors across speakers. The data presented in FIGS. 4A–4G are taken from observations of six speakers reading a training text selected from a large body of text consisting of 15620 newspaper sentences. The training text was selected by processing the large body of text by the process described in connection with FIG. 3. Processing the large body of text produced a training text consisting of six sentences, which represents a minimal training text for training the target model given by equation (2) discussed in connection with FIG. 3. The database constructed from the reading of the training corpus by the six speakers consists of 4346 phones, with 1529 vowels, 599 closures (phrase-initial closures excluded), 552 bursts with aspiration, 561 nasal codas, 401 fricatives and 594 sonorants.

Figure 4A:
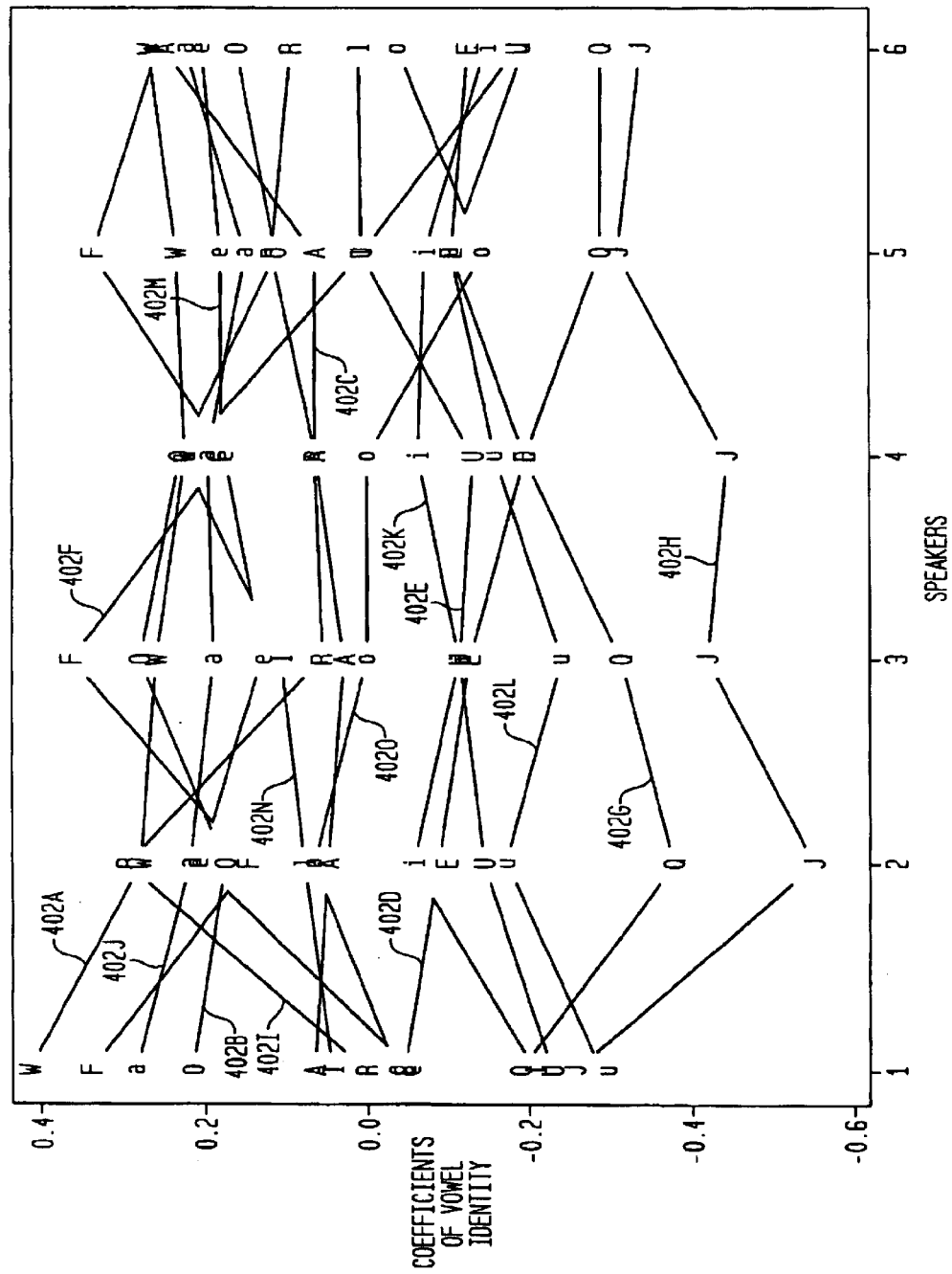

FIG. 4A illustrates a graph 400 illustrating the effect of the vowel identity factor across speakers. The graph 400 consists of curves 402A–402I. Each of the curves 402A–402I illustrates a plot of the log coefficient of the vowel identity factor against the speaker, with the log coefficients ranging from −0.6 to 0.4 along the y-axis, while the speakers range from speaker 1 to speaker 6 along the x-axis. The curve 402A represents W=[aw], the curve 402B represents O=[ow], the curve 402C represents A=[aj], the curve 402D represents E=schwa, the curve 402E represents U=[ü], the curve 402F represents F, which is a fronted and raised [a], the curve 402G represents Q, which is an apical vowel, the curve 402H represents J, which is a high retroflex vowel and the curve 402I represents R, which is a low retroflex vowel, the curve 402J represents a, which is a low vowel, the curve 402K represents i, which is a high vowel, the curve 402L represents u, which is a high vowel, the curve 402M represents the vowel u, the curve 402N represents the vowel I and the curve 402O represents the vowel o.

The graph 400 illustrates the cross-speaker consistency of the vowel identify factor. It can be seen, for example, that the apical vowels J and Q, illustrated by the curves 402H and 402G, respectively, are the shortest for all speakers. The high vowels I, u, and U are in the next group, while low vowels a and diphthongs are the longest.

Figure 4B:
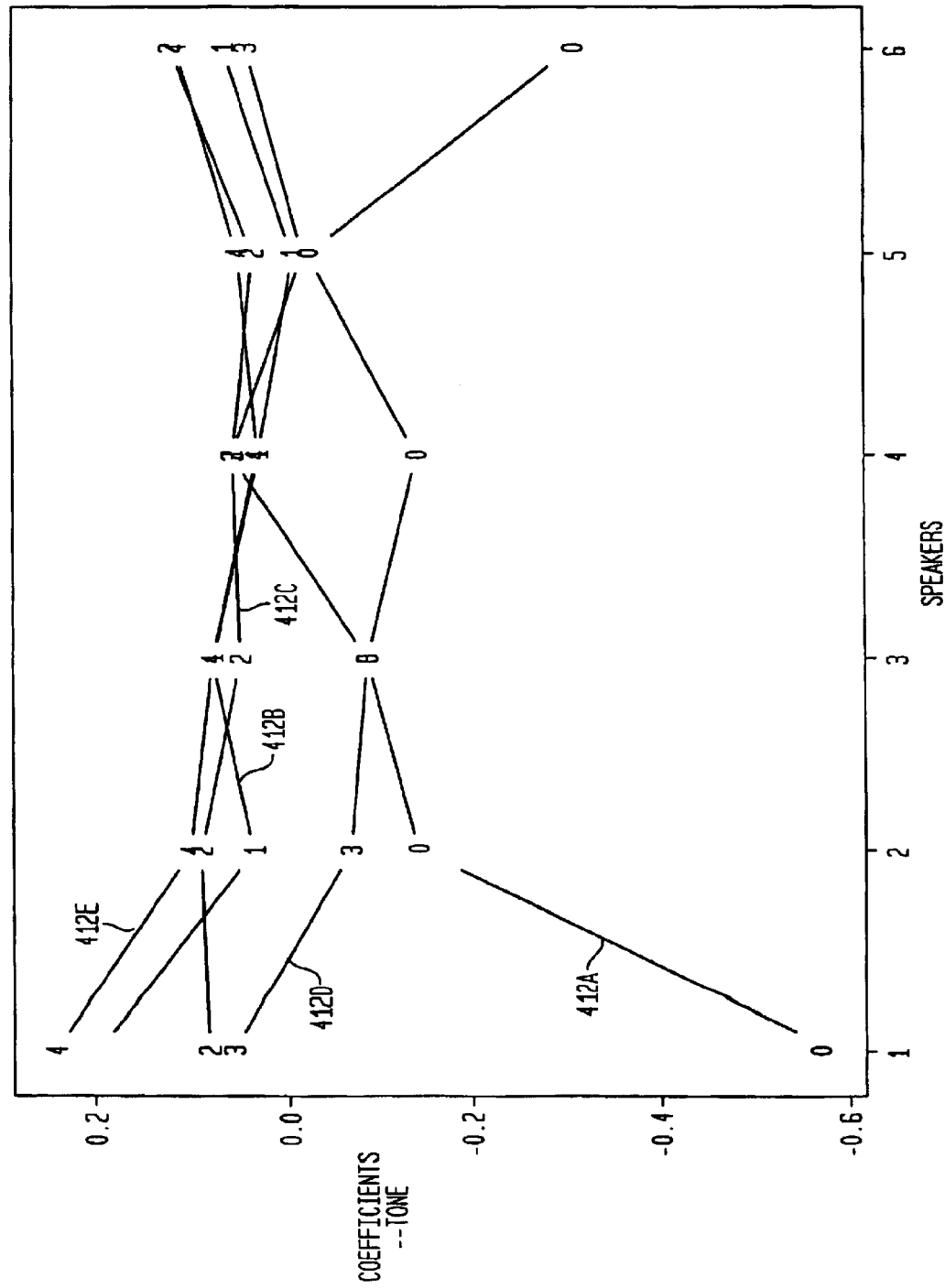

FIG. 4B illustrates a graph 410 plotting log coefficients of effects of tones against speakers. The graph 410 includes the curves 412A representing 0, or a neutral tone, the curve 412B representing 1, a high level tone, the curve 412C representing 2, a rising tone, the curve 412D representing 3, a falling-rising tone and the curve 412E representing 4, a falling tone. It can be seen that some speakers maintain clear contrast between full tone and neutral tone syllables, as in speaker 1, while some hardly make any distinction, as in speaker 5. This trait reflects dialectical differences between northern and southern speakers. Northern speakers tend to have strong durational contrast in neutral tone and full tone while southern speakers do not. The tone coefficients show that for all speakers, the neutral tone labeled as 0 and illustrated in the curve 412A consistently has the strongest shortening effect on vowels. The magnitude of this effect is different for each speaker.

Figure 4C:
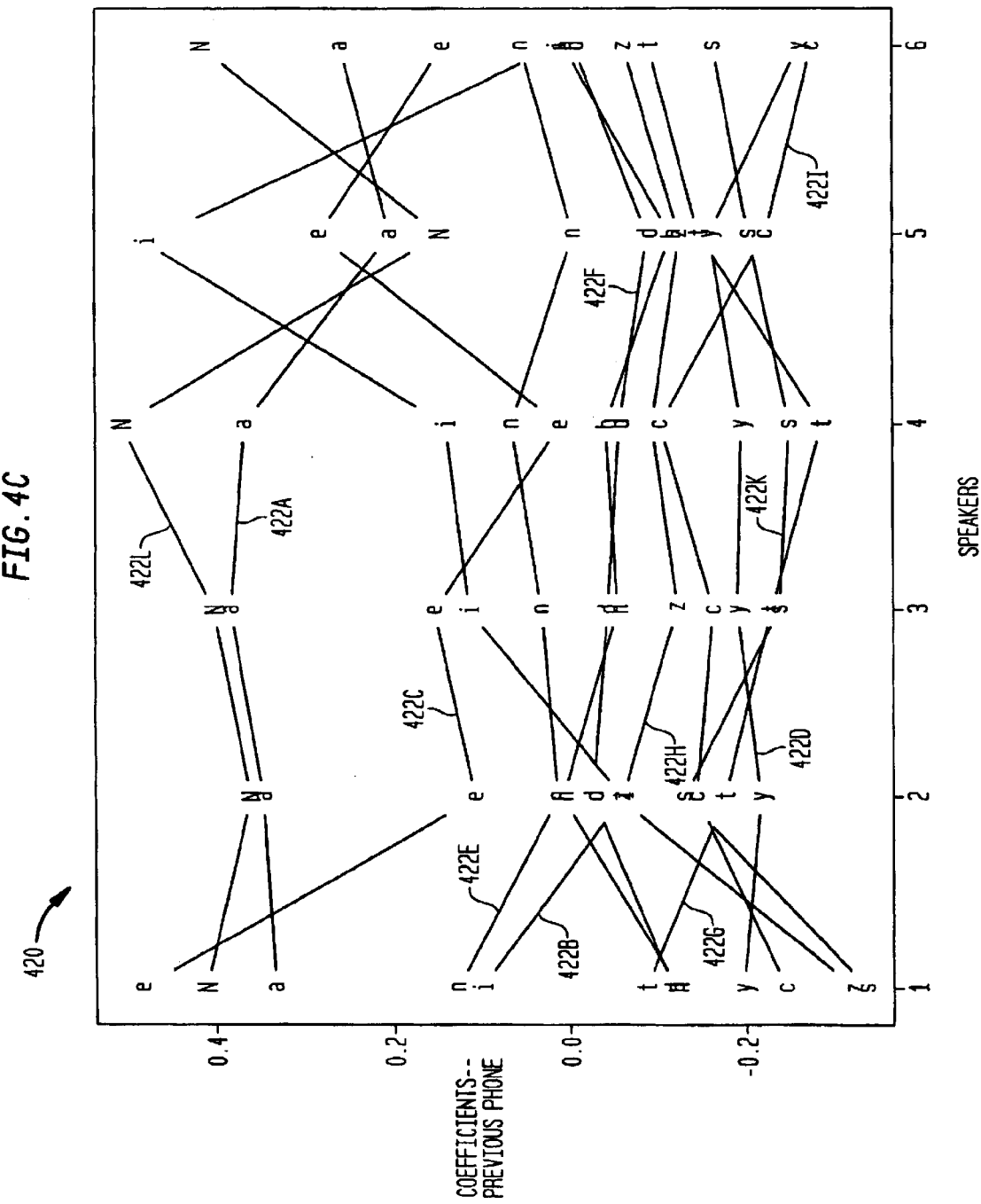

FIG. 4C illustrates a graph 420 plotting log coefficients of effects of preceding phones against speakers. The graph includes the curves 422A representing a=low vowels or diphthongs, 422B representing i=high vowels, 422C representing e=mid vowels, 422D representing y=glides, 422E representing n=nasals, 422F representing d=unaspirated stops, 422G representing t=aspirated stops, 422H representing z=voiced fricatives, 422I representing c=affricates, h=[h] and [f], 422K representing s=voiceless fricatives excluding h and f, and 422L representing N=syllable coda nasals. It can be seen that when the preceding phone is a syllable coda nasal represented by the curve 422L, or a vowel represented by the curve 422A, 422B or 422C, the duration of a vowel is lengthened. Among syllable onset consonants the preceding nasals represented by the curve 422E have the strongest lengthening effect. The effect is consistent for all speakers. When a vowel is preceded by other consonants, the duration is relatively short.

FIG. 4D illustrates a graph 430 plotting log coefficients of the effect of following phones against speakers. The graph includes the curve 432A representing a=vowels, 432B representing y=glides, 432C representing t=stops, 432D representing n=nasals, 432E representing s=fricatives and 432F representing N=syllable coda nasals. It can be seen that the shortening effect of a syllable coda nasal, represented by the curve 432E, is observed for all speakers. The magnitude of this effect is rather strong. Among other categories of sounds, vowels followed by stops tend to be shorter.

Figure 4E:
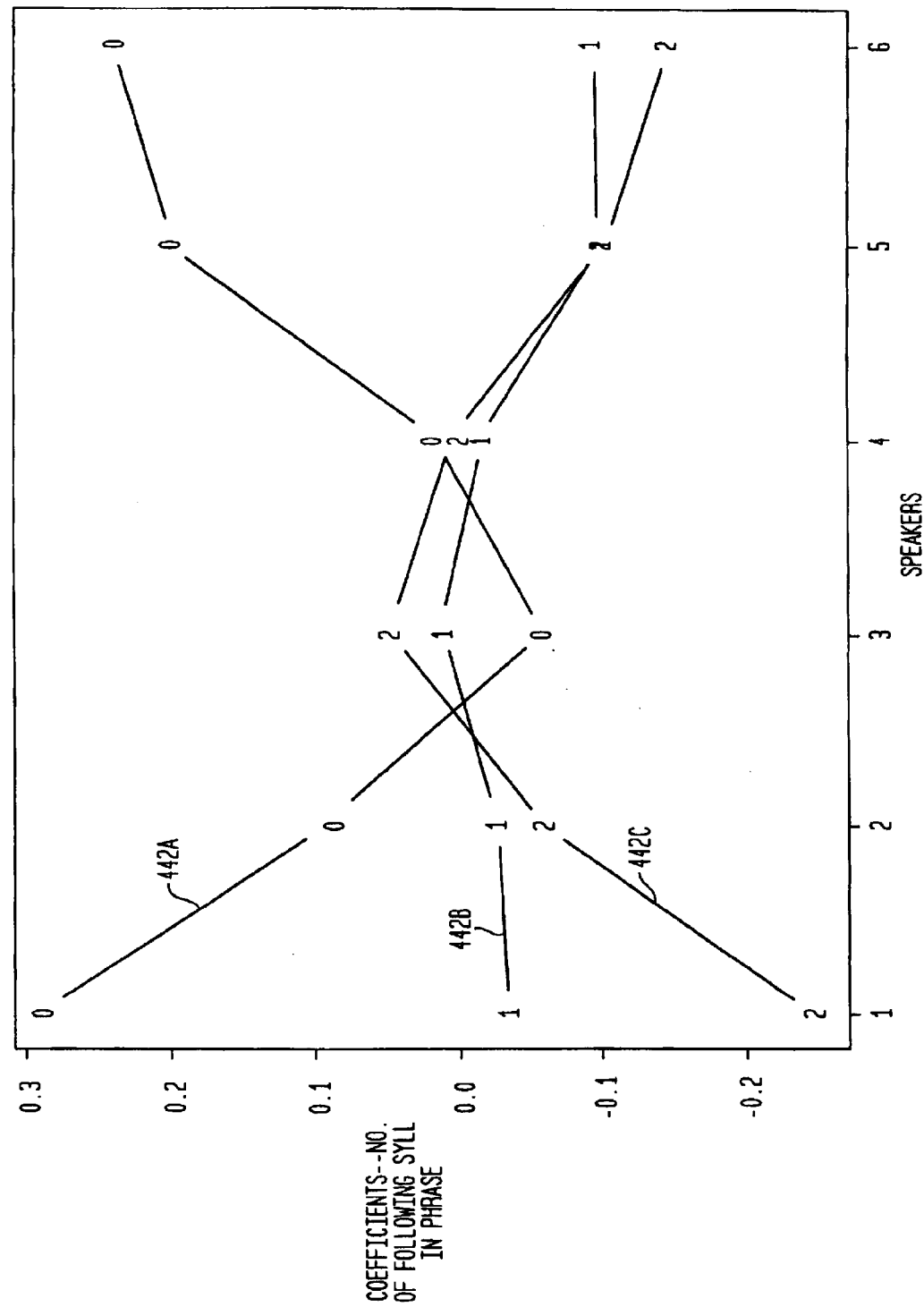

FIG. 4E illustrates a graph 440 FIG. 4D plotting log coefficients of the effect of the number of following syllables against speakers. The graph 440 includes the curve 442A representing the effect of 0 following syllables, meaning that the syllable being affected is the final syllable in the phrase. The graph 440 also includes the curve 442B representing the effect of 1 following syllable and the curve 442C representing the effect of 2 following syllables. The graph 440 shows that the final syllable in the phrase, represented by the curve 442A, tends to be longest. Most speakers also show a weaker final lengthening effect on the penultimate syllable, that is, where there is only one following syllable.

Figure 4F:
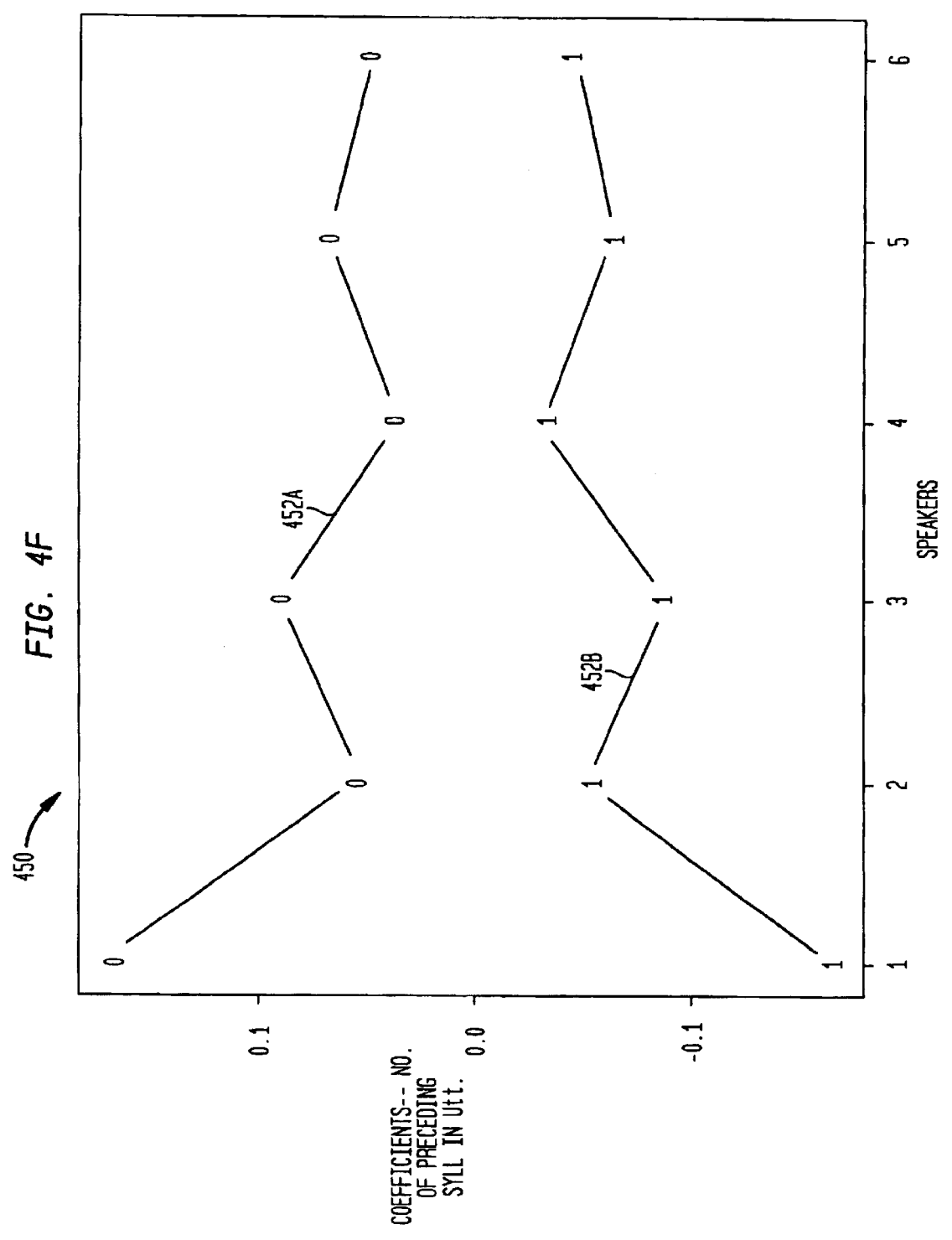

FIG. 4F illustrates a graph 450 plotting log coefficients of the initial utterance against speakers. This factor has two levels, initial utterance syllables represented by the curve 452A and non-initial syllables represented by the curve 452B. The graph 450 illustrates that there is a consistent lengthening effect on the vowel of the initial utterance syllable.

FIG. 4G illustrates a graph 460 plotting the syllable structure against speakers. Syllables with a glide, namely CGV, CGVV, GV, GVV and CGVC are represented by the curve 462A employing the plotting symbol G. Other types of syllable structures, including V, VV, CV, CVV and CVC are represented by the curve 462B employing the plotting symbol V. Glide has a consistent shortening effect.

The cross-speaker consistency illustrated by the graphs discussed above allows the creation of a target model using variations between the source speaker and the target speaker. Because variations of the effect of a particular factor are consistent between speakers for all levels of a factor, there is only a need to determine one modification parameter for each factor. The modification parameter identifies the degree to which the coefficients of the source speaker needs to be modified to mimic the target speaker.

Figure 5:
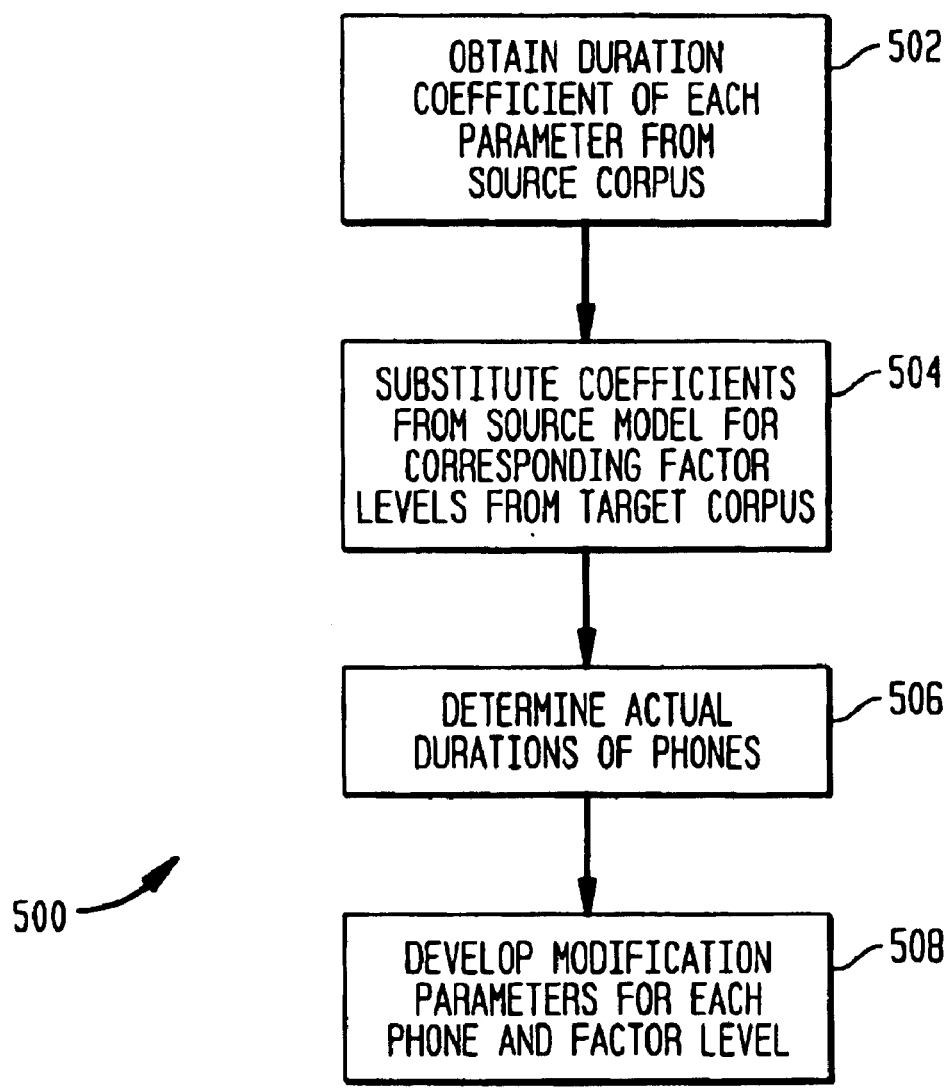
FIG. 5 illustrates a process of target speaker modeling according to the present invention.

FIG. 5 illustrates a process of target corpus analysis and target model creation 500 according to the present invention. The process 500 is preferably employed to implement step 110 of the process 100 of FIG. 1. At step 502, the duration coefficient of each parameter is obtained from the analysis of the source corpus which was previously conducted in connection with creation of the source model. At step 504, the coefficient values predicted by the source model of the various parameters are employed to substitute for the corresponding parameters in the target corpus. At step 506, the actual duration of each phone appearing in the target corpus is determined. At step 508, a set of modification parameters is developed for each phone. The modification parameters will yield durational values for the phones approximating the duration pattern of the target speaker.

As noted above, the duration, as predicted by the target speaker model, of a phone p as uttered by a speaker S is given by the following equation:

$$Dur(p)_s = D_{mean}(p)^k * D1(f1)^{k1} * \ldots * Dn(fn)^{kn}. \qquad (2)$$

For each phone p, the actual duration of the phone is known from the target corpus. The values of $D_{mean}(p)$ and D1(f1), ..., Dn(fn) are known from the values appearing in the source model, which includes a corrected mean value for each phone and a value for each parameter. Equation (2) can therefore be solved for k, k1, ... ,kn. It is not necessary to solve for the values of D1(f1), ... ,Dn(fn) because these have already been determined in solving equation (1) using the source speaker training corpus. Only the values of k, k1, ... , kn are needed, requiring a much smaller training corpus for their determination. The values of k, k1, ... , kn may suitably be obtained by creating a data matrix a matrix corresponding to equation (2) and including coefficients from the source model, and fitting a robust regression model to this matrix to predict the observed durational data. The coefficients obtained from the regression model are employed as the values of k, k1, ... , kn and are employed, together with the coefficients obtained from the source model, to create the target model.

Once the values of k are found for a particular speaker, they can be used to process any desired text by substituting the mean duration of each phone presented by the text and the parameters affecting each phone, and choosing and substituting the appropriate values of k for the particular speaker, phone and parameters in question.

Figure 6:
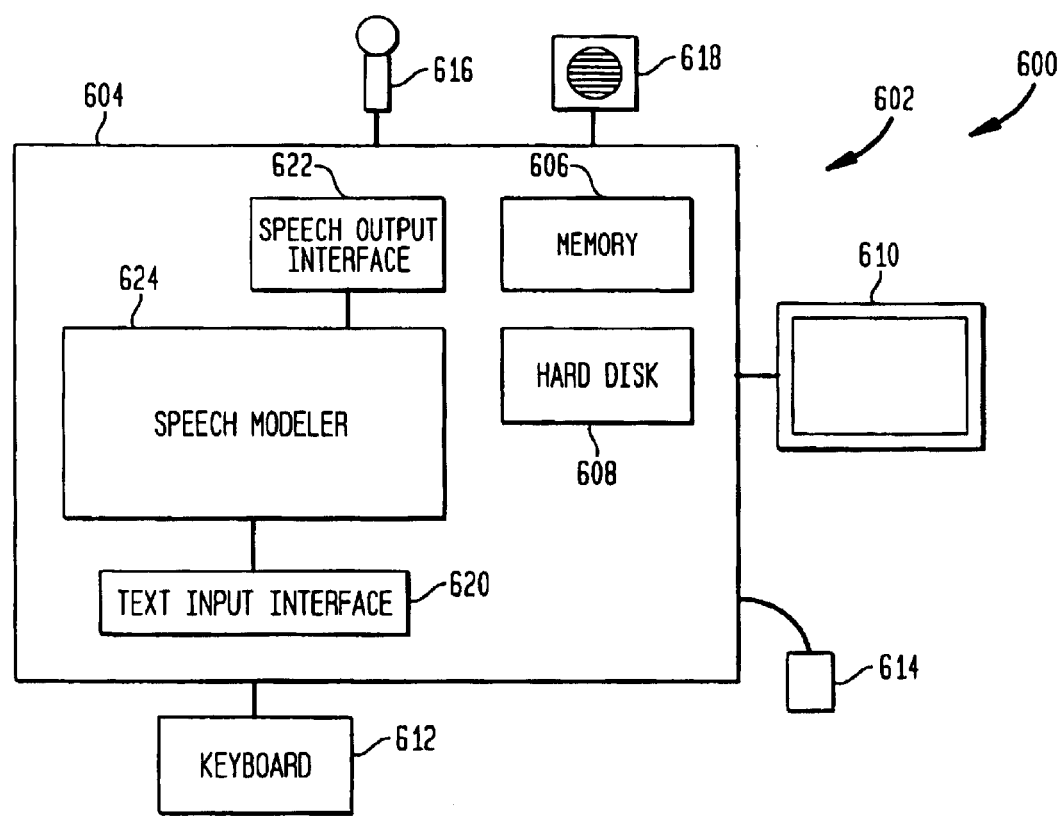
FIG. 6 illustrates a text to speech system according to the present invention.

FIG. 6 illustrates a text to speech system 600 according to the present invention. The system 600 includes a computer 602 including a processing unit 604 including memory 606 and hard disk 608, monitor 610, keyboard 612 and mouse 614. The computer 602 also includes a microphone 616 and loudspeaker 618. The computer 602 operates to implement a text input interface 620 and a speech output interface 622. The computer 602 also provides a speech modeler 624, adapted to receive text from the text input interface 620, apply the text to a target speaker model 626 to develop speech, and output the speech to the loudspeaker 618 using the speech output interface 622. The speech modeler 624 may suitably be adapted to develop a target model in order to copy the durational characteristics of a desired speaker. In order to develop the target model, the speech modeler 624 first employs a source model based on processing of a large training corpus resulting from reading of a large body of text selected to provide information about language specific and speaker specific characteristics of a chosen source speaker. The source model is preferably a copy of a previously generated source model developed for use with a number of different text to speech systems such as the system 600, but may alternatively be developed by training the system 600 using a large speech corpus.

In order to develop a target model for the system 600, the speech modeler 624 is trained by reading of a small body of training text selected from a larger body of training text. The small body of training text is chosen to provide maximum information about speaker specific characteristics of a target speaker, and is preferably a previously developed body of text distributed with systems such as the system 600 for use in developing a target model for each system. The small body of training text is read to form a target speaker training corpus and the target speaker training corpus is processed along with the source model to develop modification parameters reflecting differences in durational characteristics between the target speaker and the characteristics of the source model. Once created, the modification parameters are applied to the source model to create the target model.

Figure 7:
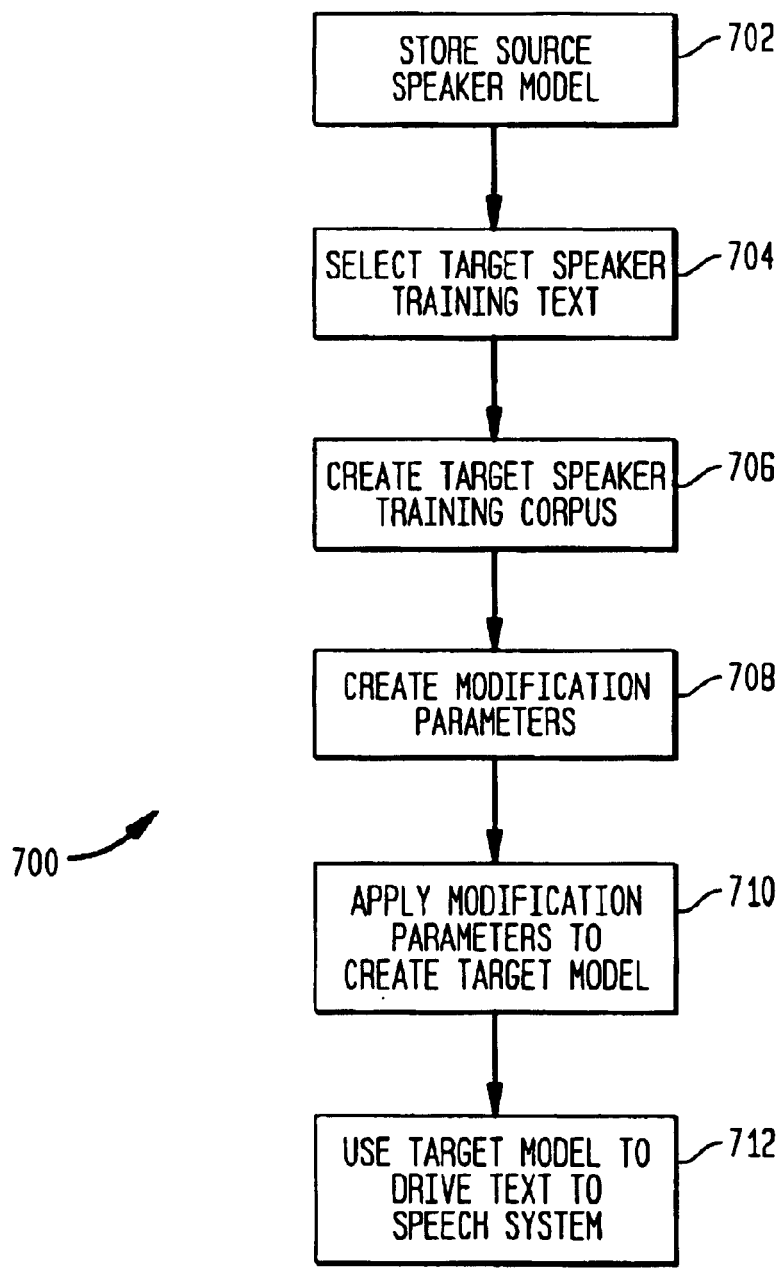
FIG. 7 illustrates a process of text to speech processing according to the present invention.

FIG. 7 illustrates a process of text to speech processing 700 according to the present invention. At step 702, a previously stored source speaker model is retrieved. At step 704, a target speaker training text is selected. At step 706, reading of the target speaker training text by a target speaker is received and used to create a target speaker training corpus. At step 708, the target speaker training corpus is processed to develop modification parameters for the source speaker model. At step 710, the modification parameters are applied to the source speaker model to create a target speaker model reflecting durational characteristics of the speaking style of the target speaker. At step 712, the target speaker model is used to drive a text to speech system. In the operation of the text to speech system, text entries are received and processed using the target speaker model to create speech output reflecting the durational characteristics of the speaking style of the target speaker.

It is possible to employ the teachings of the present invention to allow for communication which can be made to mimic voice characteristics of the sender without requiring the communication resources needed to transmit actual speech from the sender.

Figure 8:
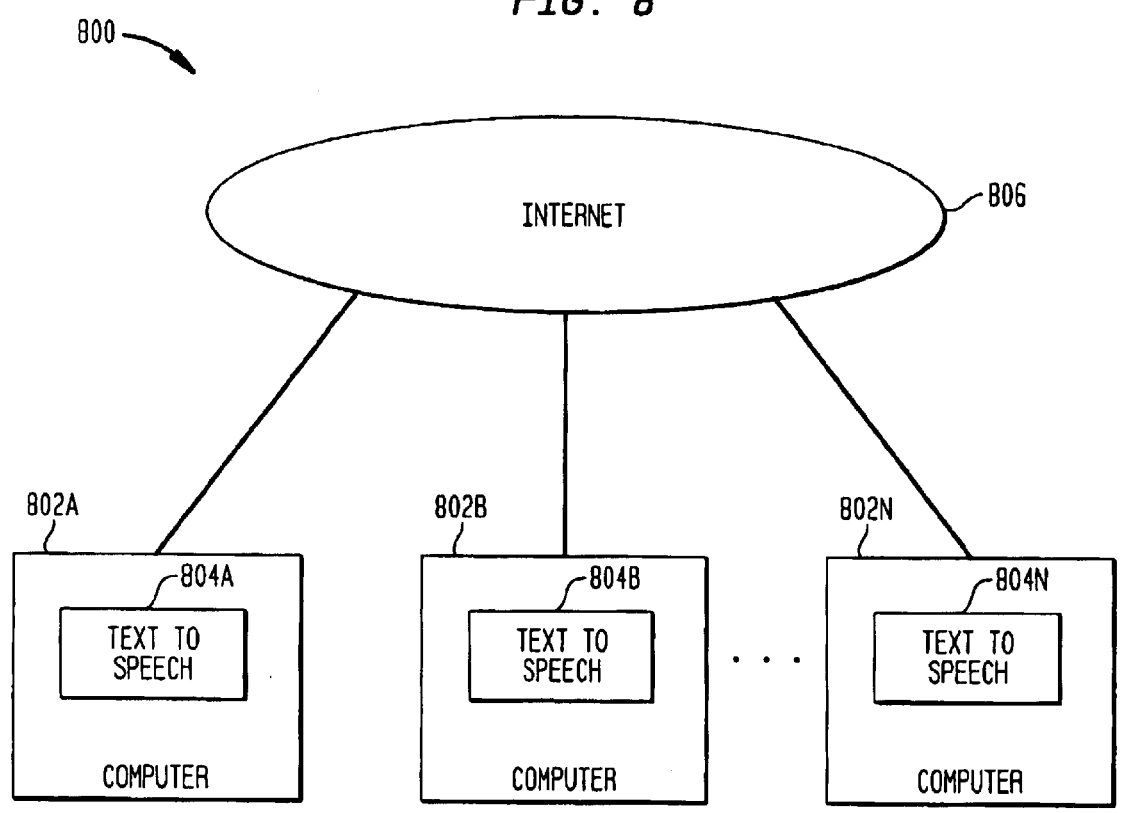
FIG. 8 illustrates a communication system according to the present invention.

FIG. 8 illustrates a communication system 800 according to the present invention. The system 800 includes a plurality of text transmission stations shown implemented here as a plurality of sending and receiving computers 802A . . . 802N. Each of the sending and receiving computers 802A . . . 802N implements a text to speech system 804A . . . 804N according to the present invention. For simplicity, only the operations of the computers 802A and 802B will be described in detail, with the computer 802A designated as the sending computer and the computer 802B designated as the receiving computer. It will be recognized, however, that each of the computers 802A . . . 802N may be used for sending or receiving, depending on the immediate needs of the user. Each of the text to speech systems 804A . . . 804N implements a source model processing a training corpus provided by a single standard speaker. Each of the computers 802A . . . 802N also provides a selection of target speaker training text for developing parameters for a target speaker model. When a user wishes to train the computer 802A to mimic his or her speaking characteristics, the user reads the target speaker text selection. The computer 802A processes the target speaker text selection to develop a set of modification parameters to be used to modify the source model coefficients to mimic the speaking characteristics of the target speaker. When it is desired to send text communication, for example an email message, which can be played to provide a voice message having the speaking characteristics of the user, the computer 802A transmits the message, along with an attachment containing the modification parameters, to the computer 804B over a communication medium such as the Internet 806. When the message arrives at the computer 802B, the computer 802B employs the modification parameters to develop a target model reflecting the speaking characteristics of the sender. The computer 802B then processes the message using the text to speech system 804B in order to produce a voice message having the speaking characteristics corresponding to the sender.

It is also possible to use the techniques of the present invention to achieve increased efficiency in the use of communication bandwidth. In wireless communications in particular, bandwidth is usually at a premium. A typical wireless communication system sends representations of a user's voice over a communication channel. The representation of the user's voice requires significant bandwidth, which may approach or on occasion exceed the capacity of the communication channel. Text communication requires a much smaller bandwidth than does voice communication. A wireless communication system employing the principles of the present invention can transmit voice communication as text while providing a voice representation mimicking the voice of the user.

Figure 9:
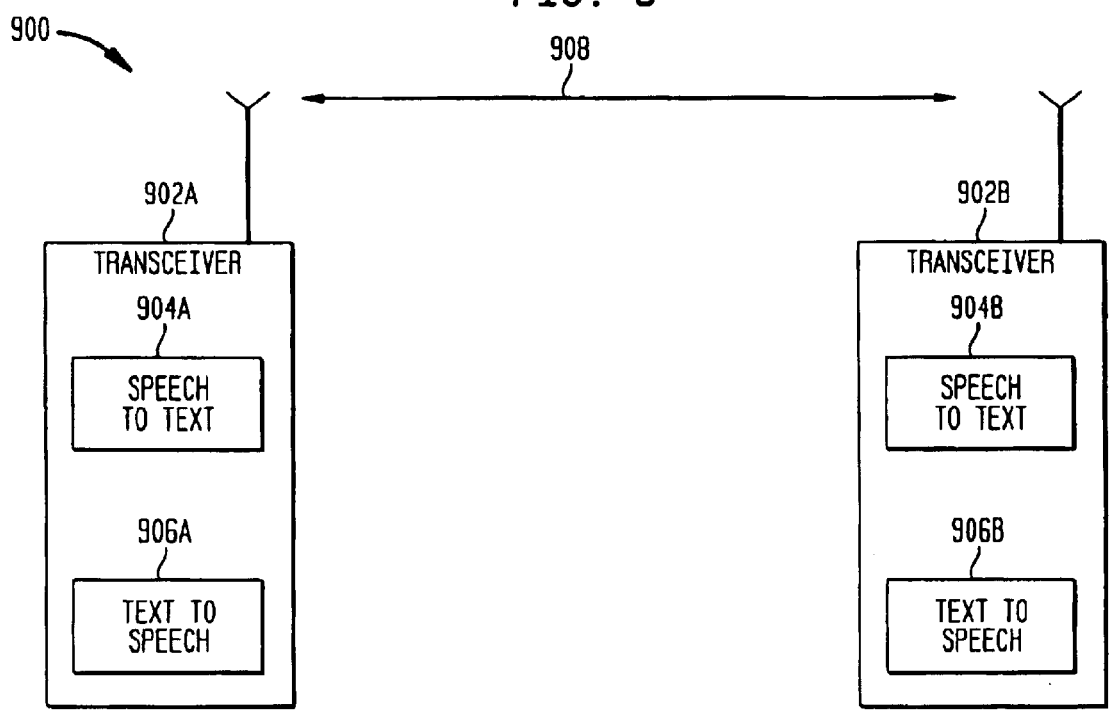
FIG. 9 illustrates a wireless telephone system according to the present invention.

FIG. 9 illustrates a wireless telephone system 900 according to the present invention. The telephone system 900 includes a first transceiver 902A implementing a speech to text system 904A and a text to speech system 906A employing the principles of the present invention. The system 900 also includes a second transceiver 902B which similarly implements a speech to text system 904B and a text to speech system 906B. The first and second transceivers 902A and 902B communicate over a wireless communication channel 908. Each of the text to speech systems 906A and 906B preferably implement a standard source model trained to a standard speaker. Each of the text to speech systems 906A and 906B is also preferably trained to develop modification parameters reflecting the speaking style of a user or users of the transceiver 902A and 902B. When a connection is established between the transceivers 902A and 902B, each of the transceivers 902A and 902B transmits the modification parameters for the user to the other transceiver. Each of the text to speech systems 906A and 906B creates a target model 908A and 908B, respectively, reflecting the speaking style of the user of the other transceiver. When the user of the transceiver 902A speaks, the speech to text system 904A converts his or her speech to text which is then transmitted to the transceiver 902B. The text to speech system 906B then uses the target model 908B to produce speech reflecting the speaking style of the user of the transceiver 902A. A similar procedure is followed when the user of the transceiver 902B speaks, in order to allow the transceiver 902A to produce speech reflecting the speaking style of the user of the transceiver 902B.

While the present invention is disclosed in the context of a presently preferred embodiment, it will be recognized that a wide variety of implementations may be employed by persons of ordinary skill in the art consistent with the above discussion and the claims which follow below.

We claim:

1. A method of training a target speaker model for use in text to speech processing, the target speaker model reflecting durational characteristics of a target speaker, comprising the steps of:

retrieving a previously developed source model having source model coefficients reflecting durational characteristics of a source speaker;

developing modification parameters reflecting differences in durational characteristics of the source speaker and those of the target speaker, the modification parameters being developed using a training corpus developed using text chosen independently of text used to develop the source model; and applying the modification parameters to the source model coefficients to produce the target speaker model.

2. The method of claim 1 wherein the step of developing the modification parameters includes developing a target speaker training corpus reflecting speaker specific characteristics of the target speaker and processing the target speaker training corpus to produce the modification parameters.

3. The method of claim 2 wherein developing the target speaker training corpus includes selecting a target speaker training text and receiving voice inputs produced by a reading of the target speaker training text by the target speaker.

4. The method of claim 3 wherein selecting the target speaker training text includes assembling a large body of text and selecting a subset of the large body of text chosen to reflect speaker specific characteristics of the large body of text.

5. The method of claim 4 wherein selecting the subset of the large body of text comprises finding an optimum full-rank matrix comprising a small set of sentences containing enough data to develop the modification parameters to be used to create the target speaker model.

6. The method of claim 5 wherein the target speaker model is generated by developing and using parameters in the target speaker model equation $Dur(p)_s = D_{mean}(p)^{k} * D_1(f1)^{k1} * \ldots * D_n(fn)^{kn}$, where $Dur(p)_s$ is the duration of each phone as spoken by the target speaker s, $D_{mean}(p)$ is the coefficient of the corrected mean duration of each phone as taken from the source model, $D_1(f1), \ldots, D_n(fn)$ are durational effects of each parameter present in the source model, k is the modification parameter of the phone, and k1, ..., kn are modification parameters of factors, the modification parameters reflecting durational differences between the source model and the target speaker.

7. The method of claim 6 wherein the step of generating the modification parameters includes substituting the values of $D_{mean}(p)$ and $D_1(f1), \ldots, D_n(fn)$ taken from the source model into the target speaker model equation for each of the phones in the target speaker training corpus, substituting the actual values of $Dur(p)_s$ from the target speaker training corpus into the target speaker model equation, and solving the target speaker model equation for the values of k, k1, ..., kn.

8. The method of claim 4 wherein selecting the subset of the large body of text includes operating on the large body of text to produce sets of feature vectors corresponding to each sentence in the large body of text, mapping the sets of feature vectors into a plurality of incidence matrices, converting the incidence matrices to design matrices based on a target speaker model equation chosen to receive parameters to create the target speaker model, and finding a matroid cover for the plurality of design matrices.

9. The method of claim 8 wherein finding the matroid cover for the plurality of design matrices includes applying a greedy algorithm incorporating a modified Gram-Schmidt orthonormalization procedure.

10. The method of claim 9 wherein the source model and the target model predict durational characteristics of Chinese Mandarin speech.

11. A text to speech system for receiving text input and producing speech output corresponding to the text input, the speech outputs reflecting durational characteristics of a target speaker, comprising:

a text input interface for receiving the text input;

a target speaker modeler for applying a target speaker model to the text input to define durational characteristics of the speech output, the target speaker model including source model coefficients reflecting durational characteristics of a source speaker and a set of modification parameters applied to the source model, the set of modification parameters reflecting differences in durational characteristics between the source speaker and the target speaker, the target speaker model and the source speaker model having been developed independently of the text input for which speech output is to be produced; and a speech output interface for producing the speech output.

12. The system of claim 11, further comprising a target speaker trainer for processing a target speaker corpus to develop the modification parameters.

13. The system of claim 12 wherein the target speaker corpus is obtained by reading of a target speaker text selection by the target speaker.

14. A communication system comprising:
   a communication channel; and
   a plurality of transmission stations, each of the plurality of transmission stations being operative to transmit a text message over the communication channel, each of the transmission stations being operative to create a set of modification parameters reflecting voice characteristics of a target speaker;
   a plurality of receiving stations, each of the receiving stations being operative to receive the message and the modification parameters, to apply the modification parameters to a target speaker model including source model coefficients, the target speaker model and the source speaker model having been developed using text chosen independently of text comprising the text message, and to use the target speaker model to process the text message to produce speech output reflecting durational characteristics of the target speaker.

15. The communication system of claim 14 wherein each of the transmission stations is operative to create a set of modification parameters by processing a training corpus created by reading of a target speaker training text by the target speaker.

16. The communication system of claim 15 wherein each of the transmission stations is also operative to function as a receiving station and wherein each of the receiving stations is also operative to function as a transmission station.

17. The communication system of claim 16 wherein the communication channel is the Internet.

18. A voice communication system comprising:
   a communication channel;
   a first transceiver operative to store a set of modification parameters reflecting speech characteristics of a user and to transmit the set of modification parameters upon initiation of a communication connection, the first transceiver being also operative to receive a voice input from a speaker and to process the voice input using a speech to text system to produce a text transmission, the first transceiver being operative to transmit the text transmission; and
   a second transceiver operative to receive the set of modification parameters from the first transceiver and to apply the modification parameters to a target speaker model including source model coefficients, the target speaker model and the source model coefficients having been developed using text chosen independently of the text comprising the text transmission, the second transceiver being also operative to receive the text transmission from the first transceiver and process the text transmission using the target speaker model to produce speech output reflecting the durational characteristics of the target speaker.

19. The system of claim 18 wherein the first transceiver is also operative to receive modification parameters from the second transceiver, to create a target speaker model using the modification parameters, to receive a text transmission from the second transceiver and to process the text transmission using the target speaker model to produce speech output reflecting the durational characteristics of the target speaker, and wherein the second transceiver is also operative to store a set of modification parameters reflecting speech characteristics of a user and to transmit the set of modification parameters upon initiation of a communication connection, to receive a voice input from a speaker and to process the voice input using a speech to text system to produce a text transmission and to transmit the text transmission.

20. The communication system of claim 19 wherein the communication channel is a wireless communication channel.

21. A method of training a target speaker model for use in text to speech processing, the target speaker model reflecting durational characteristics of a target speaker, comprising the steps of:
   (1) retrieving a previously developed source model having source model coefficients reflecting durational characteristics of a source speaker;
   (2) developing modification parameters reflecting differences in durational characteristics of the source speaker and those of the target speaker, developing the modification parameters including developing a target speaker training corpus reflecting speaker specific characteristics of the target speaker and processing the target speaker training corpus to produce the modification parameters, developing the target speaker training corpus including:
      (a) selecting a target speaker training text and receiving voice inputs produced by a reading of the target speaker training text by the target speaker, selecting the target speaker training text including assembling a large body of text and selecting a subset of the large body of text chosen to reflect speaker specific characteristics of the large body of text, selecting the subset of the large body of text comprising finding an optimum full-rank matrix comprising a small set of sentences containing enough data to develop the modification parameters to be used to create the target speaker model;
      (b) receiving voice inputs produced by a reading of the target speaker training text by the target speaker; and
   (3) applying the modification parameters to the source model coefficients to produce the target speaker model, generating the target speaker model including developing and using parameters in the target speaker model equation $Dur(p)_s = D_{mean}(p)^k * D_1(f1)^{k1} * \ldots * D_n(fn)^{kn}$, where $Dur(p)_s$ is the duration of each phone as spoken by the target speaker s, $D_{mean}(p)$ is the coefficient of the corrected mean duration of each phone as taken from the source model, $D_1(f1), \ldots, D_n(fn)$ are durational effects of each parameter present in the source model, k is the modification parameter of the phone, and $k1, \ldots, kn$ are modification parameters of factors, the modification parameters reflecting durational differences between the source model and the target speaker.

22. The method of claim 21 wherein the step of generating the modification parameters includes substituting the values of $D_{mean}(p)$ and $D_1(f1), \ldots, D_n(fn)$ taken from the source model into the target speaker model equation for each of the phones in the target speaker training corpus, substituting the actual values of $Dur(p)_s$ from the target speaker training corpus into the target speaker model equation, and solving the target speaker model equation for the values of k, $k1, \ldots, kn$.

23. A method of training a target speaker model for use in text to speech processing, the target speaker model reflecting durational characteristics of a target speaker, comprising the steps of:
   (1) retrieving a previously developed source model having source model coefficients reflecting durational characteristics of a source speaker, the source model predicting durational characteristics of Chinese Mandarin speech;
   (2) developing modification parameters reflecting differences in durational characteristics of the source speaker and those of the target speaker, developing the modification parameters including developing a target speaker training corpus reflecting speaker specific characteristics of the target speaker and processing the target speaker training corpus to produce the modification parameters, developing the target speaker training corpus including:

(a) selecting a target speaker training text and receiving voice inputs produced by a reading of the target speaker training text by the target speaker, selecting the target speaker training text including assembling a large body of text and selecting a subset of the large body of text chosen to reflect speaker specific characteristics of the large body of text, selecting the subset of the large body of text including operating on the large body of text to produce sets of feature vectors corresponding to each sentence in the large body of text, mapping the sets of feature vectors into a plurality of incidence matrices, converting the incidence matrices to design matrices based on a target speaker model equation chosen to receive parameters to create the target speaker model, and finding a matroid cover for the plurality of design matrices, finding the matroid cover for the plurality of design matrices including applying a greedy algorithm incorporating a modified Gram-Schmidt orthonormalization procedure;

(b) receiving voice inputs produced by a reading of the target speaker training text by the target speaker; and (3) applying the modification parameters to the source model coefficients to produce the target speaker model, the target speaker model predicting durational characteristics of Chinese Mandarin speech.

* * * * *